United States Patent [19]

Zavodny

[11] E Re. 28,753

[45] Reissued Mar. 30, 1976

[54] LASER CELL

[75] Inventor: Alfred T. Zavodny, Ponca City, Okla.

[73] Assignee: Continental Oil Company, Ponca City, Okla.

[22] Filed: Mar. 12, 1973

[21] Appl. No.: 340,419

Related U.S. Patent Documents

Reissue of:

[64] Patent No.: 3,656,067
Issued: Apr. 11, 1972
Appl. No.: 35,781
Filed: May 8, 1970

[52] U.S. Cl. ..... 331/94.5 C; 330/4.3
[51] Int. Cl.[2] ..... H01S 3/03
[58] Field of Search ..... 331/94.5; 330/4.3

[56] References Cited

UNITED STATES PATENTS

| | | | |
|---|---|---|---|
| 3,311,846 | 3/1967 | Simpson et al. | 331/94.5 |
| 3,568,088 | 3/1971 | Dessus | 331/94.5 |
| 3,569,859 | 3/1971 | Whitney | 331/94.5 |

FOREIGN PATENTS OR APPLICATIONS

| | | | |
|---|---|---|---|
| 1,922,285 | 2/1970 | Germany | 331/94.5 |

*Primary Examiner*—William L. Sikes
*Attorney, Agent, or Firm*—William A. Mikesell, Jr.

[57] ABSTRACT

A fluid-filled amplifier cell for laser generation comprises an elongated housing wherein at least one end contains, within the cell, a window supported at the Brewster angle and wherein such end is plugged with a mirror.

3 Claims, 4 Drawing Figures

LASER CELL

Matter enclosed in heavy brackets [ ] appears in the original patent but forms no part of this reissue specification; matter printed in italics indicates the additions made by reissue.

This invention relates to a fluid laser generation cell. In one aspect, the invention relates to a laser generation cell for producing a linearly polarized output in a simple and relatively inexpensive manner by providing a cell having an internal Brewster window aligned with a mirrored end closure.

Laser generation cells currently available fall generally into two classes, viz, a relatively inexpensive cell having mirrored end closures which does not produce a linearly polarized output, and a relatively expensive cell having window end closures, set at the Brewster angle, in conjunction with external mirrors to obtain laser action; the latter type cell is more versatile and useful because of its linearly polarized output but, as noted, is substantially more expensive.

It is accordingly an object of the present invention to provide a simple and relatively inexpensive fluid laser generator cell capable of producing a linearly polarized output.

Other aspects, objects, and the several advantages of this invention will become apparent upon study of this disclosure, the appended claims, and the drawing, in which:

Figure 1:
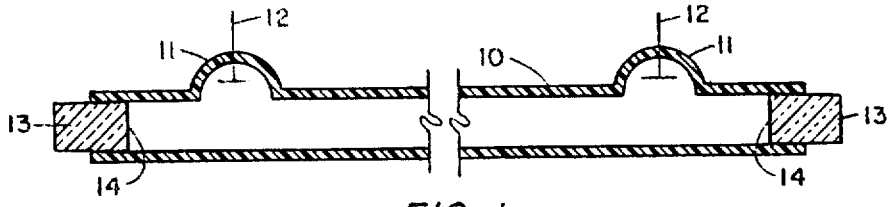
FIG. 1 PRIOR ART
FIG. 1 illustrates one type of cell of the prior art.

Referring now to the drawings, and to FIG. 1 in particular, there is illustrated a cell of the prior art which is of simple construction and accordingly is relatively inexpensive. Such a cell comprises an elongated body tube 10 having offset portions 11 for positioning of electrodes 12, which provide means for the input of energy to the cell, as is known in the art. Tube 10 is made fluid-tight by end closures 13 which are made reflecting at their inner faces 14. The only optical criticality of such a cell is the parallel alignment of faces 14. This cell, however, generates an output which is not linearly polarized, and should it be desired to polarize such output, it must be directed through some polarization device where it will lose theoretically at least 50 percent of its power and, as a practical matter, more. This type cell has the additional disadvantage of mirror deterioration because of electrical currents.

Figure 2:
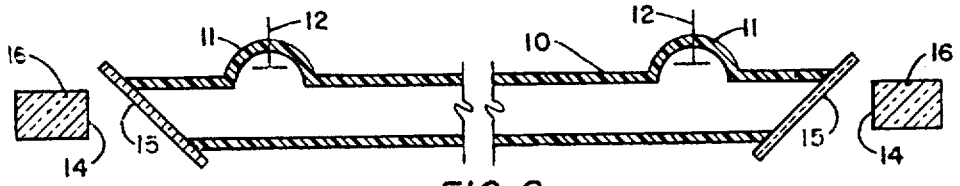
FIG. 2 PRIOR ART
FIG. 2 illustrates a second type of cell of the prior art.

The prior-art cell of FIG. 2 is of the type more expensive to manufacture, and comprises a tube 10, portions 11, and electrodes 12 similar to those of FIG. 1. In this cell, the ends of tube 10 are closed by windows 15 which are set at the Brewster angle (that angle whose tangent equals the index of refraction of the material of which window 15 is made) with respect to the longitudinal axis of tube 10. Further, where two windows are used as shown, they must be oriented properly about the longitudinal axis of the tube with respect to each other. Laser action is provided by mirrored faces 14 on substrates 16. Because of the windows 16 being set at the Brewster angle, the output of this cell is linearly polarized, but the cell is more expensive to build than that of FIG. 1.

Figure 3:
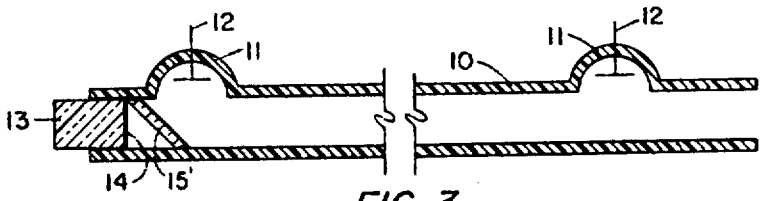
FIG. 3 illustrates a cell according to one embodiment of the present invention.
Figure 4:
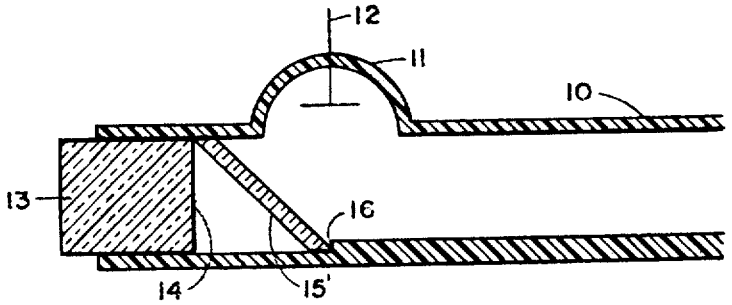
FIG. 4 illustrates a cell according to a second embodiment of the present invention.

According to the invention, I have discovered that a cell having a linearly polarized output can be built more simply by incorporating Brewster windows within the cell of the type of FIG. 1, as shown in FIG. 3. Here, the cell of FIG. 1 is modified by inserting within tube 10 a window 15' which is oriented at the Brewster angle, but which does not additionally serve as a closure for tube 10. Thus, window 15' need only be easily and inexpensively beveled so as to slide within tube 10; closeness of fit is not critical, since window 15' does not serve as a closure. Further, the window does not need to be rotated to any particular position about the longitudinal axis of the tube unless two windows are used. There is no theoretical power loss caused by polarization in this device, and the mirror surfaces are sealed from environmental deterioration while being shielded from the electrical current. The embodiment of FIG. 4 is similar to that of FIG. 3, with the addition of a stop 16, which can comprise simply a larger bore diameter in the end portion of tube 10. In this embodiment, beveled window 15' is held in position against stop 16 by end closure 13, which is again provided with a reflective inner face 14.

The various materials of construction of the cell, the working fluid within the cell, and the method of excitation of the cell are all within the skill of the art, and do not form a part of the present invention.

It will be understood that various changes in the details, materials, steps, and arrangement of parts, which have been herein described and illustrated in order to explain the nature of the invention, may be made by those skilled in the art within the principle and scope of the invention.

What is claimed is:

1. In a fluid-filled laser generator cell:

a. an elongated hollow body having first and second ends;

b. means for imparting energy to a fluid to be contained within said body;

c. *non-closure* window means within said body at a position intermediate said ends, said window means being oriented with respect to the longitudinal axis of said body at an angle about equal to its Brewster angle; and d. closure means *at* at least one of said ends in association with means for reflecting oriented about perpendicularly to said longitudinal axis.

2. The device of claim 1 wherein said body is substantially cylindrical and said window means comprises a translucent disc having opposed substantially planar parallel faces and having an edge beveled to substantially conform with the interior surface of said body.

3. The device of claim 2 wherein said interior surface of said body is further provided with stop means for engaging said edge at about the location thereon most remote from said closure means.

* * * * *